(12) United States Patent
Zhang et al.

(10) Patent No.: US 11,193,183 B2
(45) Date of Patent: Dec. 7, 2021

(54) ENERGY COMPENSATED EQUIPOWER DENSITY OBLIQUE LASER SHOCK METHOD

(71) Applicant: GUANGDONG UNIVERSITY OF TECHNOLOGY, Guangdong (CN)

(72) Inventors: Yongkang Zhang, Guangzhou (CN); Chaohui Lin, Guangzhou (CN); Zeming Zhou, Guangzhou (CN); Zheng Zhang, Guangzhou (CN); Guoxin Lu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/017,452

(22) Filed: Sep. 10, 2020

(65) Prior Publication Data

US 2020/0407819 A1    Dec. 31, 2020

Related U.S. Application Data

(63) Continuation of application No. PCT/CN2018/102599, filed on Aug. 28, 2018.

(30) Foreign Application Priority Data

May 18, 2018   (CN) .......................... 201810483359.7

(51) Int. Cl.
  *C21D 10/00*   (2006.01)
  *B23K 26/356*  (2014.01)

(52) U.S. Cl.
  CPC .......... *C21D 10/005* (2013.01); *B23K 26/356* (2015.10)

(58) Field of Classification Search
  CPC ........................... B23K 26/356; B23K 26/352
  USPC ............... 219/121.78, 121.6, 121.61, 121.85
  See application file for complete search history.

(56) References Cited

U.S. PATENT DOCUMENTS

| | | | |
|---|---|---|---|
| 9,909,195 B2* | 3/2018 | Zhang | B23K 26/1464 |
| 2002/0000428 A1* | 1/2002 | Dulaney | B23K 26/06 219/121.69 |
| 2009/0313823 A1* | 12/2009 | Rockstroh | F01D 5/005 29/889.1 |

FOREIGN PATENT DOCUMENTS

| | | |
|---|---|---|
| CN | 101962710 A | 2/2011 |
| CN | 103203543 A | 7/2013 |
| CN | 103898281 A | 7/2014 |
| CN | 103898313 A | 7/2014 |

(Continued)

*Primary Examiner* — Tu B Hoang
*Assistant Examiner* — Alba T Rosario-Aponte

(57) ABSTRACT

The present invention relates to the technical field of material surface peening, and more particularly to an energy compensated equipower density oblique laser shock method. The method includes: acquiring a radius of curvature of a peening region of a part to be processed, and judging a range of a laser incident angle; determining laser parameters, such as laser pulse width, a spot diameter, and required laser energy under a vertical incidence condition; calculating the required laser energy at the minimum incident angle, and judging whether the energy falls within the technical indexes of a laser; and performing laser shock peening on the part by pulse laser beams with different energies. According to the present invention, the laser power or energy is compensated according to changes in the incident angle and the radius of curvature of the part to be processed.

6 Claims, 2 Drawing Sheets

(56) References Cited

FOREIGN PATENT DOCUMENTS

| CN | 104164538 A | 11/2014 |
|----|-------------|---------|
| CN | 106238916 A | 12/2016 |

* cited by examiner

ENERGY COMPENSATED EQUIPOWER DENSITY OBLIQUE LASER SHOCK METHOD

CROSS-REFERENCE TO RELATED APPLICATIONS

This application is a continuation of International Application No. PCT/CN2018/102599, filed on Aug. 28, 2018, which claims the benefit of priority from Chinese Patent Application No. 201810483359.7 filed on May 18, 2018. The content of the aforementioned applications, including any intervening amendments thereto, is incorporated herein by reference.

TECHNICAL FIELD

The present invention relates to the technical field of material surface peening, and more particularly, to an energy compensated equipower density oblique laser shock method.

BACKGROUND OF THE PRESENT INVENTION

Laser shock, which is a technology of peening metal by shock waves inducted by strong laser, can substantially enhance the durability of metal materials. Laser has good reachability and accurate positioning; therefore, laser shock peening technology can be performed on some parts that cannot be processed by traditional surface peening. The laser shock peening technology is especially suitable for such parts as holes, chamfers, welds and grooves. However, the laser shock peening must be performed in an oblique incident angle when being performed on an impeller or an arc root of the whole blade. As the incident angle and an arc angle are changed, the shape and area of the projection plane of the laser beam on the surface are also changed, causing uneven laser shock peening effect.

SUMMARY OF THE PRESENT INVENTION

The purpose of the present invention is to overcome the shortcomings of the existing art, and provides an energy compensated equipower density oblique laser shock method based on an incident angle and a radius of curvature, to ensure the unchanged laser power density in the same region or on the same trajectory and improve the evenness of residual stress distribution.

To solve the technical problem, the present invention adopts the following technical solutions:

An energy compensated equipower density oblique laser shock method, including the following steps:

S1. acquiring a radius of curvature R of an arc peening region of a part to be processed and morphological characteristics thereof, judging a range of a laser incident angle $\alpha$, and acquiring a minimum incident angle $\alpha_{min}$;

S2: determining, according to a mechanical property of the part to be processed and a processing strength requirement thereof, laser parameters including laser pulse intensity, a spot diameter D, and required laser energy Eo under a vertical incidence condition;

S3. determining required laser energy E at the minimum incident angle $\alpha_{min}$ according to the minimum incident angle $\alpha_{min}$ determined in Step S1, the radius of curvature R and the spot diameter D determined in Step S2; and judging whether the laser energy E falls within the technical indexes of the laser, and proceeding to Step S4 if yes; and if no, returning to Step S2 to reselect the laser parameters;

S4. determining a peening path of the arc peening region of the part to be processed and a spot lapping rule; and S5. performing laser shock peening to the part by pulse laser beams with different energies through the different incident angles.

According to the energy compensated equipower density oblique laser shock method, the laser power or energy is compensated according to changes in the incident angle and the radius of curvature of the part to be processed, thereby avoiding uneven peening effect arisen from changes in the shape and area of a projection plane of the laser beam on the surface of the part, achieving isointensity peening, ensuring unchanged laser power density in the same region or on the same trajectory, improving the evenness of residual stress distribution and the shock effect, and reducing roughness of the laser shock processed surface.

Preferably, the range of the laser incident angle $\alpha$ is $\alpha_{min} < \alpha < 90°$. The laser incident angle $\alpha$ is obtained according to the radius of curvature R of the arc peening region of the part to be processed and the influence of adjacent parts of the part to be processed to the regions to be processed.

Preferably, the part to be processed in Step S1 is an impeller including a bladed disk and a blade. The arc region is arranged at the joint of the bladed disk and the impeller. The laser shock peening is suitable for parts that cannot be processed by traditional surface peening, such as holes, chamfers, welds and grooves, and widely used in the arc peening region of the root of the impeller.

Preferably, the calculation of the required laser energy E at the minimum incident angle $\alpha_{min}$ in Step S3 includes the following steps:

S31. when the incident angle $\alpha$ is minimum, the spot area S is:

$$S = \left(2R - \sqrt{4R^2 - D^2}\right) \int_0^{\frac{D}{2}} \sqrt{1 + \frac{16R^2}{(D^2 - 4x^2)\cos^2\alpha}}\, dx;$$

S32. the required laser energy E during the oblique shock is:

$$E = \frac{4E_0 S}{\pi D^2} = \frac{4E_0\left(2R - \sqrt{4R^2 - D^2}\right)}{\pi D^2} \int_0^{\frac{D}{2}} \sqrt{1 + \frac{16R^2}{(D^2 - 4x^2)\cos^2\alpha}}\, dx.$$

Preferably, in a peening path of the part to be processed in Step S4:

S41. the laser peening starts at an end face of the arc peening region;

S42. the part to be processed is moved to increase the incident angle gradually and uniformly, and the arc peening region is shocked at the minimum incident angle $\alpha_{min}$ or by the required laser energy E at the minimum incident angle $\alpha_{min}$, till to the maximum incident angle;

S43. the part to be processed is rotated, shocked at the maximum incident angle, and moved to decrease the incident angle gradually and uniformly, till to the end face of the arc peening region; and S44. reciprocating circulation is performed till the end face at one side of the arc peening region is peened.

Preferably, the spot lapping rule in Step S4 includes that a spot lapping rate $\eta$ is kept unchanged during the laser shock peening. The spot lapping rate $\eta$ is a ratio between a length a' of a curve connected at the intersection of the adjacent spots and a length a of a curve at two points which are farthest from the spot.

Preferably, steps of preprocessing a region to be peened, clamping the part to be processed and storing the peening path determined in Step S4 in the laser are included before Step S5. Preprocessing, clamping of the part to be processed, setting and storage of the peening path parameters are conventional operations of the laser, thus creating a precondition for shock peening of the part to be processed.

Compared with the existing art, the present invention has the following beneficial effects:

According to the energy compensated equipower density oblique laser shock method, the laser power or energy is compensated according to changes in the incident angle and the radius of curvature of the part to be processed, thereby avoiding uneven peening effect arisen from changes in the shape and area of a projection plane of the laser beam on the surface of the part, achieving isointensity peening, ensuring unchanged laser power density in the same region or on the same trajectory, improving the evenness of residual stress distribution and the shock effect, and reducing roughness of the laser shock processed surface.

Figure 1:
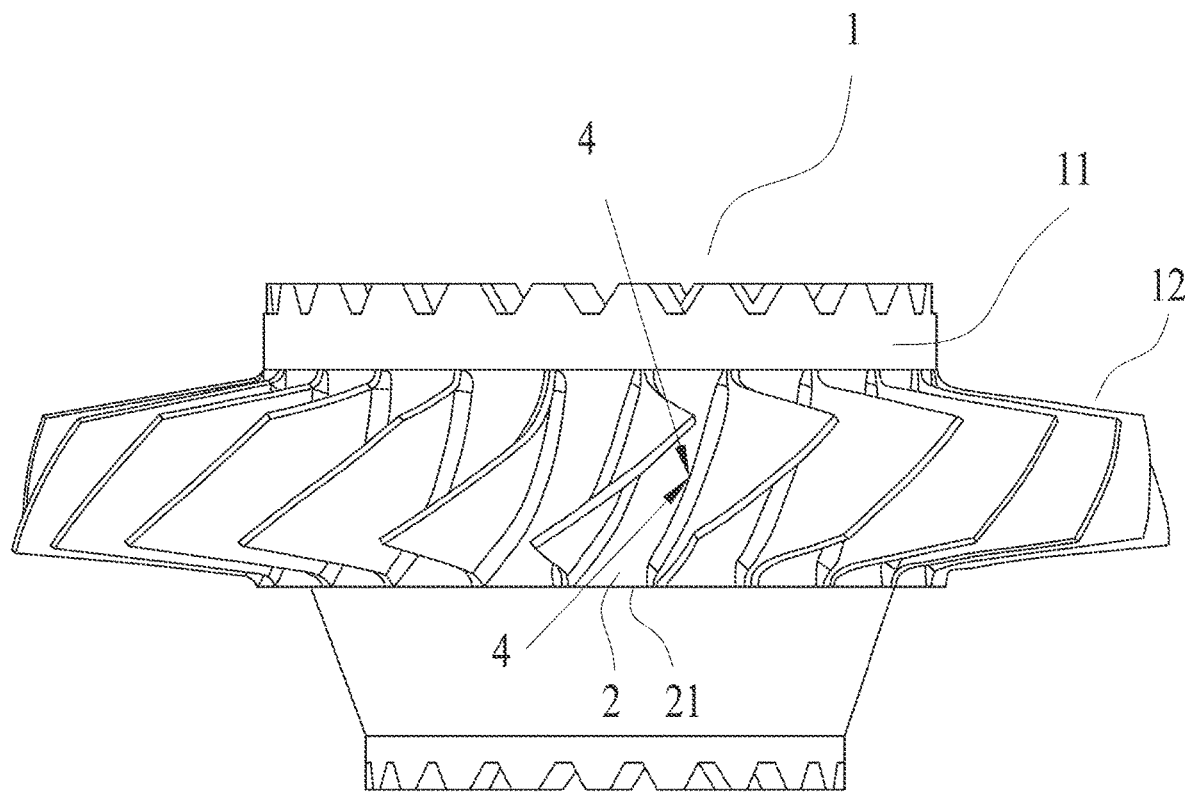
FIG. 1 is a schematic diagram of an incident beam of an intermediate region peened at a minimum incident angle in Embodiment I.

In the drawings: 1, part to be processed; 11, bladed disk; 12, blade; 2, arc peening region; 21, end face; 3, laser spot; 31, intersections of the laser spot and an ensuing laser spot; 32, two points which are farthest from the laser spot; and 4, laser incident direction.

DETAILED DESCRIPTION OF THE PRESENT INVENTION

The present invention is further described below in combination with the specific embodiments. Drawings are only used for exemplary description, and represent schematic diagrams only, rather than physical drawings, and thus, shall not be understood as the limitation to the present patent. To describe the embodiments of the present invention better, some components in the drawings may be omitted, amplified or reduced, and do not represent the dimensions of actual products. It could be understood for those skilled in the art that some known structures and description thereof in the drawings may be omitted.

The same or similar labels in the drawings of the embodiments of the present invention correspond to the same or similar components. In the description of the present invention, it should be understood that, if orientation or position relationships of terms "up", "down", "left" and "right" are the orientation or position relationships shown based on the drawings, such relationships only facilitate the description of the present invention and simplify the description, rather than indicating or implying that the indicated position or the components must have the specific orientation and constructed and operated in the specific orientation. Therefore, the terms for describing the position relationship in the drawings are only used for exemplary description, and shall not be understood as the limitation to the patent. Those ordinary skilled in the art could understand the specific meanings of the above terms according to the specific situations.

Embodiment 1

Figure 2:
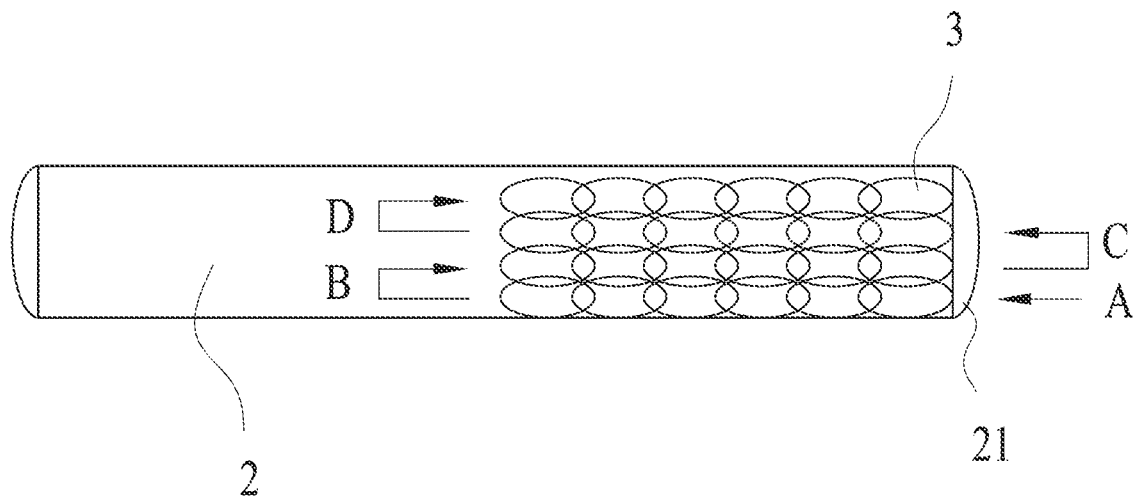
FIG. 2 is a schematic diagram of a peening path of an arc peening region in Embodiment I.
Figure 3:
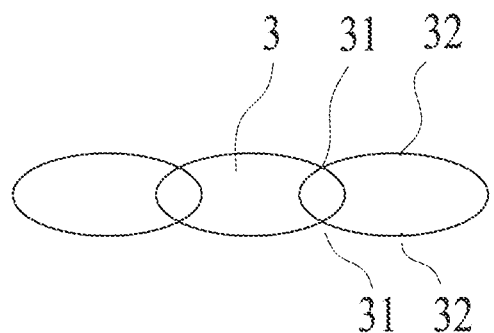
FIG. 3 is a schematic diagram of a spot lapping rate in Embodiment I.

FIG. 1 to FIG. 3 show the first embodiment of an energy compensated equipower density oblique laser shock method, including the following steps:

S1. acquiring a radius of curvature R of an arc peening region 2 of a part to be processed 1 and morphological characteristics thereof, judging a range of a laser incident angle α, and acquiring a minimum incident angle $\alpha_{min}$. In the present embodiment, the range of the laser incident angle α is $\alpha_{min} < \alpha < 90°$, the part to be processed 1 in the present embodiment is an impeller including a bladed disk 11 and a blade 12, and the arc region 2 is arranged at the joint of the bladed disk 11 and the impeller; where the laser incident angle α refers to an angle between a laser incident direction 4 and a surface of the arc peening region 2;

S2: determining, according to a mechanical property of the part to be processed 1 and a processing strength requirement thereof, laser parameters including laser pulse intensity, a diameter D of a laser spot 3, and required laser energy Eo under a vertical incidence condition;

S3. determining required laser energy E at the minimum incident angle $\alpha_{min}$ according to the minimum incident angle $\alpha_{min}$ determined in Step S1, the radius of curvature R and the diameter D determined in Step S2; and judging whether the laser energy E falls within the technical indexes of the laser, and proceeding to Step S4 if yes; and if no, returning to Step S2 to reselect the laser parameters, wherein the calculation of the required laser energy E at the minimum incident angle $\alpha_{min}$ in Step S3 includes the following steps:

S31. when the incident angle α is minimum, the spot area S is:

$$S = \left(2R - \sqrt{4R^2 - D^2}\right)\int_0^{\frac{D}{2}} \sqrt{1 + \frac{16R^2}{(D^2 - 4x^2)\cos^2\alpha}}\, dx;$$

S32. the required laser energy E during the oblique shock is:

$$E = \frac{4E_0 S}{\pi D^2} = \frac{4E_0\left(2R - \sqrt{4R^2 - D^2}\right)}{\pi D^2}\int_0^{\frac{D}{2}} \sqrt{1 + \frac{16R^2}{(D^2 - 4x^2)\cos^2\alpha}}\, dx;$$

S4. determining a peening path of the arc peening region 2 of the part to be processed 1 and a spot lapping rule, where the peening path directs the laser spot 3 to move along arrows indicated by A, B, C and D in the arc peening region 2 as shown in FIG. 2.

wherein in the peening path of the part to be processed 1 in Step S4:

S41. the laser peening starts at an end face 21 of the arc peening region 2;

S42. the part to be processed 1 is moved to increase the incident angle gradually and uniformly, and the arc peening region 2 is shocked at the minimum incident angle $\alpha_{min}$ or by the required laser energy E at the minimum incident angle $\alpha_{min}$, till to the maximum incident angle;

S43. the part to be processed 1 is rotated, shocked at the maximum incident angle, and moved to decrease the incident angle gradually and uniformly, till to the end face 21 of the arc peening region 2; and S44. reciprocating circulation is performed till the end face 21 at one side of the arc peening region 2 is peened.

As shown in FIG. 3, the spot lapping rule in Step S4 includes that a spot lapping rate η is kept unchanged during the laser shock peening. The spot lapping rate 11 is a ratio between a length a' of a curve connected at the intersection 31 of the adjacent spots and a length a of a curve at two points 32 which are farthest from the spot.

S5. Performing laser shock peening to the part 1 by pulse laser beams with different energies through the different incident angles. Steps of preprocessing a region to be peened, clamping the part to be processed 1 and storing the peening path determined in Step S4 in the laser are included before Step S5.

Through the above steps, the laser power or energy is compensated according to changes in the incident angle and the radius of curvature of the part to be processed 1, thereby avoiding uneven peening effect arisen from changes in the shape and area of a projection plane of the laser beam on the surface of the part 1, achieving isointensity peening, ensuring unchanged laser power density in the same region or on the same trajectory, improving the evenness of residual stress distribution and the shock effect, and reducing roughness of the laser shock processed surface.

Apparently, the above embodiments of the present invention are only examples taken for clearly describing the present invention, rather than limiting the embodiments of the present invention. Those ordinary skilled in the art can also make other different forms of changes or vibrations based on the above description. All embodiments need not and cannot be illustrated herein. Any modification, equivalent replacement and improvement made within the spirit and principle of the present invention shall fall within the protection scope of claims of the present invention.

What is claimed is:

1. An energy compensated equipower density oblique laser shock method, comprising the following steps:
    S1. acquiring a radius of curvature R of an arc peening region of a part to be processed and morphological characteristics thereof; inputting the radius of curvature R and the morphological characteristics into a simulation software to acquire a minimum incident angle $\alpha_{min}$; and setting a laser incident angle $\alpha$ to be greater than or equal to $\alpha_{min}$ and be less than 90°, wherein the laser incident angle $\alpha$ is measured from a surface of the arc peening region;
    S2: selecting laser parameters within a set range, wherein the laser parameters comprise laser pulse intensity, a diameter D of a laser spot, and required laser energy Eo when the laser incident angle $\alpha$ is 90 degrees;
    S3. determining required laser energy E at the minimum incident angle $\alpha_{min}$; and judging whether the laser energy E falls within a predetermined range, and proceeding to Step S4 if yes; and no, returning to Step S2 to reselect the laser parameters; wherein the required laser energy E at the minimum incident angle $\alpha_{min}$ is determined by performing steps of S31 to S32:
    S31: setting the incident angle $\alpha$ as $\alpha_{min}$, and calculating a spot area S according to $$S = \left(2R - \sqrt{4R^2 - D^2}\right) \int_0^{\frac{D}{2}} \sqrt{1 + \frac{16R^2}{(D^2 - 4x^2)\cos^2\alpha}} \, dx;$$

S32: calculating the required laser energy E during oblique shock according to $$E = \frac{4E_0 S}{\pi D^2} = \frac{4E_0\left(2R - \sqrt{4R^2 - D^2}\right)}{\pi D^2} \int_0^{\frac{D}{2}} \sqrt{1 + \frac{16R^2}{(D^2 - 4x^2)\cos^2\alpha}} \, dx;$$

S4: performing laser shock peening to the part by pulse laser beams with different energies through different incident angles along a peening path and following a spot lapping rule, wherein the peening path directs the laser spot to move in the arc peening region; and the spot lapping rule comprises a spot lapping rate η which is kept unchanged during the laser shock peening;
    wherein Step S4 is performed according to the following steps:
    S41: the laser peening starts at an end face of the arc peening region;
    S42: the part to be processed is moved to increase the incident angle gradually and uniformly, and the arc peening region is shocked at the minimum incident angle $\alpha_{min}$ or by the required laser energy E at the minimum incident angle $\alpha_{min}$, till the incident angle reaches the maximum incident angle;
    S43: the part to be processed is rotated, shocked at the maximum incident angle, and moved to decrease the incident angle gradually and uniformly, till to the end face of the arc peening region; and
    S44: repeating steps S41-S43 till the end face at one side of the arc peening region is peened.

2. The energy compensated equipower density oblique laser shock method according to claim 1, wherein the part to be processed in Step S1 is an impeller comprising a bladed disk and a blade; and the arc peening region is arranged at the joint of the bladed disk and the impeller.

3. The energy compensated equipower density oblique laser shock method according to claim 1, wherein in step S4, the spot lapping rate η is calculated by dividing a distance between two intersections of the laser spot and an ensuing laser spot by a distance between two co-vertices of the laser spot.

4. The energy compensated equipower density oblique laser shock method according to claim 1, wherein before performing laser shock peening to the part, the arc peening region is preprocessed; the part to be processed is clamped; and the peening path is stored in a laser.

5. The energy compensated equipower density oblique laser shock method according to claim 2, wherein before performing laser shock peening to the part, the arc peening region is preprocessed; the part to be processed is clamped; and the peening path is stored in a laser.

6. The energy compensated equipower density oblique laser shock method according to claim 3, wherein before performing laser shock peening to the part, the arc peening region is preprocessed; clamping the part to be processed is clamped; and the peening path is stored in a laser.

* * * * *